D. S. TRAVIS.
ANIMAL TRAP.
APPLICATION FILED OCT. 2, 1911.

1,109,558.

Patented Sept. 1, 1914.

Witnesses

Inventor
David S. Travis
By C. C. Shepherd
Attorney

UNITED STATES PATENT OFFICE.

DAVID S. TRAVIS, OF MARENGO, OHIO.

ANIMAL-TRAP.

1,109,558.  Specification of Letters Patent.  Patented Sept. 1, 1914.

Application filed October 2, 1911. Serial No. 652,351.

*To all whom it may concern:*

Be it known that I, DAVID S. TRAVIS, a citizen of the United States, residing at Marengo, in the county of Morrow and State of Ohio, have invented certain new and useful Improvements in Animal-Traps, of which the following is a specification.

My invention relates to an improved form of animal trap and is particularly designed to provide a trap of a structure especially effective in trapping rats and mice, which animals are known to be of an extremely sensitive and suspicious nature.

It is aimed to produce such a structure of trap that a rat or mouse will be precipitated with extreme suddenness through the floor of the trap after it has entered a certain distance into such trap, such precipitation being effected through an extremely sensitive releasing trigger.

In the effectuation of my invention, it is aimed to obviate all raised platforms or projections or any unnatural appearance to the floor of the approach to the bait. This result is desirably attained by the provision of a pivoted floor flap for controlling the latch for the pivoted floor and so coöperating therewith, as to be returned automatically to normal position after the operation of such latch and by such latch. Such return to operative position is facilitated and insured by a checking pin, which obviates danger of excessive movement of the flap in its return to operative position.

Figure 1:
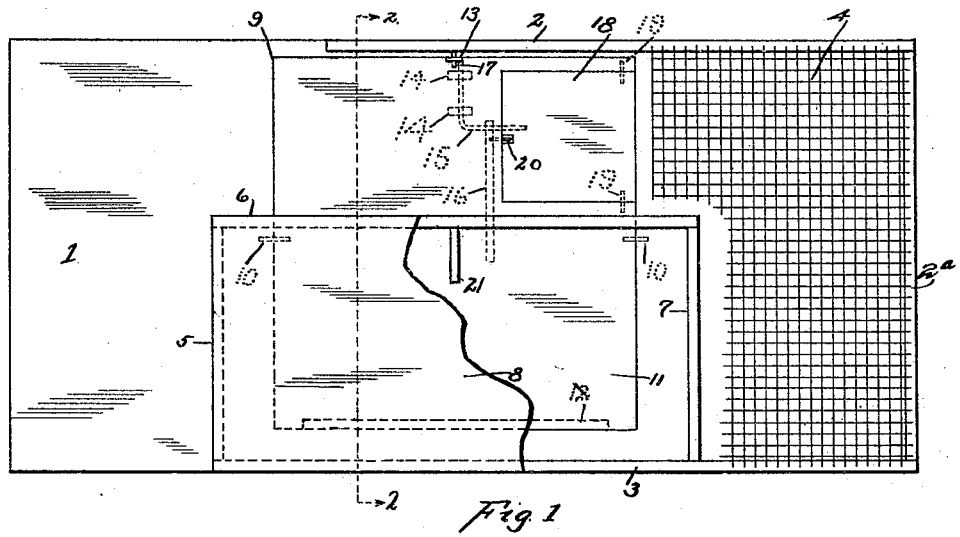
Figure 2:
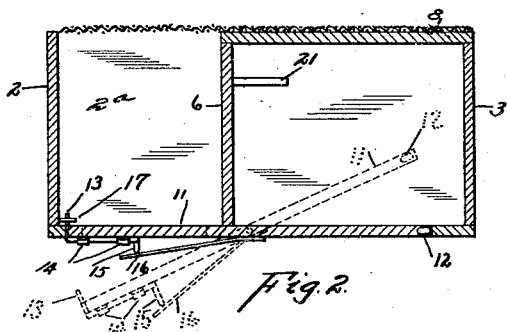
Figure 3:
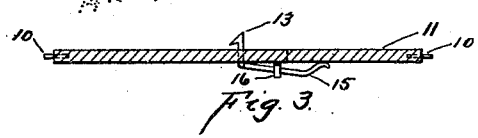

The preferred embodiment of my invention is shown in the accompanying drawings, in which similar characters of reference designate corresponding parts, and in which:

Figure 1 is a top plan view of my improved animal trap, Fig. 2 is a vertical transverse section taken on line 2—2 of Fig. 1 and looking in the direction of the arrows and showing in dotted lines the position of the pivoted floor at one point in its swinging operation, and, Fig. 3 is a longitudinal section of the pivoted floor and showing the structure of latch.

My trap comprises a main stationary floor 1, side pieces 2 and 3, a back piece 2ª connecting the sides 2 and 3, a wire covering for a portion thereof as at 4 and a box-like structure carried by the stationary floor and formed by the walls 5, 6 and 7, together with the covering plate 8. The walls 2 and 6 form a run-way which is the only means of access for the animal to the bait, which is located somewhere beneath the wire covering 4.

Substantially centrally of the stationary floor 1, there is formed a cut-away portion 9 within which is mounted, upon longitudinal pivots 10, a pivoted floor 11 having one edge provided with a slot or groove for the reception of a weight 12. This pivoted floor is provided upon its edge within the run-way with a swinging latch 13 carried within journals 14 upon the under surface of the pivoted floor and having a lateral extension 15 normally held upward by a leaf spring 16 likewise attached at one end to the under surface of the pivoted floor. This latch 13 coacts with the keeper pin 17.

Formed in the rear end of the pivoted floor is a flap 18 desirably pivoted near its rearmost extremity upon pivot pins 19 and having its forward end held in raised position by the lateral extension 15 of the latch 13 which extends there beneath. This flap is prevented from moving above the plane of the pivoted floor by a pin 20 carried by the floor.

There is mounted within the box-like structure formed by the walls 5, 6 and 7 and desirably upon the walls 6, a check pin 21 which serves to limit the swinging movement of the pivoted floor and prevent it from passing to a vertical position and thereby destroy the effect of the weight 12.

From the above, it will be observed that I have provided a structure of animal trap wherein the animal approaches the bait through a run-way over a pivoted floor. This pivoted floor is substantial and easily supports the animal until the slightest weight is applied to the flap 18. When this happens, the flap presses downwardly upon the lateral extension 15 of the latch and releases the pivoted floor, which precipitates the animal downwardly through the floor of the trap into any suitable receptacle. The weighted side of the pivoted floor is checked in its swinging movement by the check pin 21 and automatically returns the floor to normal position, where it is held by the latching action of the latch 13 under the control of the spring 16. At the same time, the lateral extension of the latch serves to automatically move the pivoted flap into proper position, where it is held by the coaction of such lateral extension and of the pin 20.

In the operation of this structure, the animal approaches the bait through an uncovered run-way and over a perfectly plane surface. There is no raised projection or platform to arouse the suspicion of such animal and his first notice of danger is when his fore feet strike the pivoted flap, when he is instantaneously precipitated through the floor of the trap.

What I claim, is—

An animal trap comprising an uncovered stationary approach, an uncovered runway, a pivoted floor for said runway in the same plane as said approach, an inclosed casing on one side of said runway, a portion of said floor extending under said casing and operating within said casing, a supplemental floor flap at the inner end of said runway pivoted at its inner end and in the same plane with said approach, a bait compartment to the rear of said flap comprising an inclosed casing covered with wire, a swing latch for maintaining said floor and flap in position, a pin to limit upward movement of said flap, a pin for limiting upward movement of said floor, and a counter weight to return said floor to operative position after said trap has been sprung.

In testimony whereof I affix my signature in presence of two witnesses.

DAVID S. TRAVIS.

Witnesses:
ELMER J. HARRIS,
PRESTON SMITH.

---

Copies of this patent may be obtained for five cents each, by addressing the "Commissioner of Patents, Washington, D. C."